United States Patent
Koto (10) Patent No.: US 7,333,660 B2
(45) Date of Patent: Feb. 19, 2008

(54) APPARATUS FOR AND METHOD OF CODING MOVING PICTURE

(75) Inventor: Shinichiro Koto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 620 days.

(21) Appl. No.: 10/991,379

(22) Filed: Nov. 19, 2004

(65) Prior Publication Data

US 2005/0129320 A1    Jun. 16, 2005

(30) Foreign Application Priority Data

Nov. 19, 2003  (JP) ............................. 2003-388881

(51) Int. Cl.
*G06K 9/36* (2006.01)
*G06K 9/46* (2006.01)

(52) U.S. Cl. .................................... 382/238

(58) Field of Classification Search ................ 382/218, 382/232, 233, 238, 246, 247; 375/240.12, 375/240.23, 240.25
See application file for complete search history.

(56) References Cited

U.S. PATENT DOCUMENTS

| | | | | |
|---|---|---|---|---|
| 4,633,325 A | * | 12/1986 | Usubuchi | 382/238 |
| 5,991,447 A | * | 11/1999 | Eifrig et al. | 382/236 |
| 6,148,109 A | * | 11/2000 | Boon et al. | 382/238 |
| 6,360,016 B1 | * | 3/2002 | Shen et al. | 382/238 |
| 6,999,627 B2 | * | 2/2006 | MacDonald et al. | 382/238 |

FOREIGN PATENT DOCUMENTS

| | | |
|---|---|---|
| JP | 5-344489 | 12/1993 |
| JP | 9-322176 | 12/1997 |
| JP | 9-327023 | 12/1997 |
| JP | 10-32816 | 2/1998 |
| JP | 10-290464 | 10/1998 |
| JP | 11-112999 | 4/1999 |
| JP | 2000-232366 | 8/2000 |
| JP | 2003-153280 | 5/2003 |
| JP | 2003-230149 | 8/2003 |

OTHER PUBLICATIONS

U.S. Appl. No. 10/991,379, filed Nov. 19, 2004, Koto.
U.S. Appl. No. 11/016,803, filed Dec. 21, 2004, Tanizawa, et al.

* cited by examiner

*Primary Examiner*—Amir Alavi
(74) *Attorney, Agent, or Firm*—Oblon, Spivak, McClelland, Maier & Neustadt, P.C.

(57) ABSTRACT

A moving picture coding apparatus includes a prediction coder generating signals to be entropy coded. Each of the signals is generated based on a different prediction mode in the prediction coder. The apparatus also includes a code amount measurer, a mode controller, and an entropy coder. The code amount measurer measures amounts of code of the signals to be entropy coded when the signals each are coded by a first entropy coding method. The mode controller selects one of the prediction modes based on a comparison of the amounts of code. The entropy coder codes the signal generated based on the selected prediction mode by a second entropy coding method having efficiency higher than that of the first entropy coding method.

15 Claims, 5 Drawing Sheets

| SYMBOL | CODEWORD | CODE LENGTH |
|---|---|---|
| 0 | 1 | 1 |
| 1 | 011 | 3 |
| 2 | 010 | 3 |
| 3 | 0011 | 4 |
| 4 | 0010 | 4 |
| 5 | 0001 1 | 5 |
| 6 | 0001 0 | 5 |
| 7 | 0000 111 | 7 |
| 8 | 0000 110 | 7 |
| 9 | 0000 1011 | 8 |
| 10 | 0000 1010 | 8 |
| 11 | 0000 1001 | 8 |
| 12 | 0000 1000 | 8 |
| 13 | 0000 0111 | 8 |
| 14 | 0000 0110 | 8 |
| 15 | 0000 0101 11 | 10 |
| 16 | 0000 0101 10 | 10 |

APPARATUS FOR AND METHOD OF CODING MOVING PICTURE

CROSS-REFERENCE TO RELATED APPLICATIONS

This application is based upon and claims the benefit of priority from the prior Japanese Patent Application No. 2003-388881 filed on Nov. 19, 2003 the entire contents of which are incorporated herein by reference.

BACKGROUND OF THE INVENTION

1) Field of the Invention

The present invention relates to a moving picture coding method and a moving picture coding apparatus and computer program product that select any one of a plurality of modes to perform coding.

2) Description of the Related Art

In conventional international standards of moving picture coding schemes such as MPEG-2 (Moving Picture Experts Group phase 2), MPEG4, and H.264, a plurality of modes are present as methods of selecting a reference image and a method of generating a block shape and a prediction error signal. Of the modes, a scheme that selects one coding mode for each pixel block to perform coding is employed.

In these moving picture coding methods, an optimum coding mode is preferably performed in coding. That is, it is preferable to select a coding mode with best coding efficiency, and quality of the reproduced image depends on this selection. More specifically, when an optimum coding mode is not selected, image quality obtained when coding is performed at the same bit rate is deteriorated than that obtained when an optimum coding mode is selected, or an amount of code required to reproduce in the same image quality disadvantageously increases.

Therefore, it is important to appropriately select a coding mode for each pixel block. A conventional technique related to a mode selection method is proposed as follows:

First conventional mode selection: Method of selecting a coding mode which achieves a small prediction error (see Japanese Patent Application Laid-Open No. 2003-153280).

Second conventional mode selection: Method of estimating an amount of generated code based on a prediction error signal or the like and selecting a coding mode in which the estimated amount of generated code is minimum (see Japanese Patent Application Laid-Open No. H10-290464).

Third conventional mode selection: Method of trying to actually perform coding for each coding mode to select a coding mode that achieves the minimum amount of code (see Japanese Patent Application Laid-Open Nos. 2003-153280 and H9-322176).

Fourth conventional mode selection: In addition to Third conventional mode selection, method of calculating coding distortion in each coding mode, i.e., an error between a decoded image and an original image to select an optimum coding mode with respect to a balance between an amount of generated code and a coding distortion (see Thomas Wiegand and Berand Girod, "Multi-frame motion-compensated prediction for video transmission", Kluwer Academic Publishers 2001).

However, in First and Second conventional mode selection, a coding mode is selected based on estimation or prediction. Therefore, the selection may not be appropriate, and coding may not be performed highly efficiently.

In contrast to this, in Third and Fourth conventional mode selection, selection is performed based on a coding amount measurement result obtained by actual coding. Therefore, it is generally known that coding can be performed highly efficiently. However, in Third and Fourth conventional mode selection, coding must be actually performed in each coding mode which can be selected to measure an amount of generated code. Although coding efficiency is improved, when the number of coding modes is large, an amount of calculation required for coding and a hardware scale increase to disadvantageously increase the cost of an encoder.

SUMMARY OF THE INVENTION

It is an object of the present invention to at least solve the problems in the conventional technology.

An apparatus for coding a moving picture according to one aspect of the present invention includes a prediction coder generating signals to be entropy coded. Each signal to be entropy coded is generated based on a different prediction mode. The apparatus also includes a code amount measurer measuring amounts of code of the signals to be entropy coded when the signals each are coded by a first entropy coding method; a mode controller selecting one of the prediction modes based on a comparison of the amounts of code; and a entropy coder coding the signal generated based on the selected prediction mode by a second entropy coding method having efficiency higher than that of the first entropy coding method.

A method of coding a moving picture according to another aspect of the present invention includes generating signals to be entropy coded, each signal to be entropy coded being generated based on a different prediction mode; measuring amounts of code of the signals to be entropy coded when the signals each are coded by a first entropy coding method; selecting one of the prediction modes based on a comparison of the amounts of code; and coding the signal generated based on the selected prediction mode by a second entropy coding method having efficiency higher than that of the first entropy coding method.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of a moving picture coding method and a moving picture coding apparatus according to the present invention will be described below with reference to the accompanying drawings.

Figure 1:
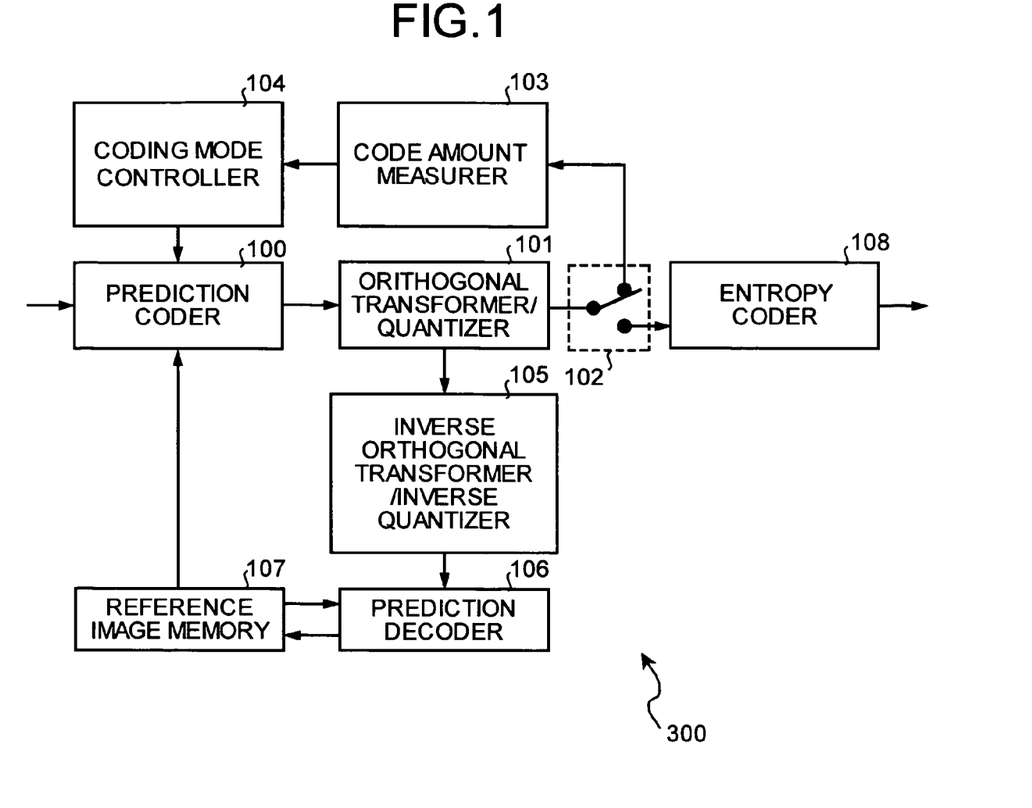
FIG. 1 is a block diagram of the configuration of a moving picture coding apparatus according to a first embodiment of the present invention.

FIG. 1 is a block diagram of the configuration of a moving picture coding apparatus according to a first embodiment of the present invention. As shown in FIG. 1, a moving picture coding apparatus 300 includes a prediction coder 100, an orthogonal transformer/quantizer 101, a switch 102, a code amount measurer 103, a coding mode controller 104, an inverse orthogonal transformer/inverse quantizer 105, a prediction decoder 106, a reference image memory 107, and an entropy coder 108.

An image signal to be coded that is input to the moving picture coding apparatus 300 is divided in units of pixel blocks. The divided image signals are input to the prediction coder 100 in units of pixel blocks. In the prediction coder 100, prediction in a frame or prediction between frames is performed to an image of each pixel block to generate and output a prediction error signal.

In the moving picture coding apparatus 300, as an in-frame prediction mode and an inter-frame prediction mode performed by the prediction coder 100, a plurality of different prediction modes having different block sizes and different methods of generating prediction error signals are prepared. The prediction coder 100 generates a prediction error signal by using a reference image temporarily stored in the reference image memory 107 in a prediction mode set by the coding mode controller 104 and generates a prediction error signal obtained by subtracting the prediction error signal from an input image signal. When a designated prediction mode performs prediction between motion compensated frames, the prediction coder 100 also detects a motion vector.

The prediction error signal generated by the prediction coder 100 is output to the orthogonal transformer/quantizer 101. The orthogonal transformer/quantizer 101 performs orthogonal transformation, quantizes a transformation coefficient, and outputs the quantized orthogonal transformation coefficient and prediction mode information (or motion vector information) to the switch 102 and the inverse orthogonal transformer/inverse quantizer 105. In the embodiment, the prediction coder 100 and the orthogonal transformer/quantizer 101 function as signal generation means that perform a moving picture coding process of a scheme conforming to the set mode.

The inverse orthogonal transformer/inverse quantizer 105 performs inverse quantization to the transformation coefficient quantized by the orthogonal transformer/quantizer 101 to restore the transformation coefficient. The inverse orthogonal transformer/inverse quantizer 105 performs an inverse orthogonal transformation process to the restored transformation coefficient to restore the prediction error signal and the like, and outputs the resultant signals to the prediction decoder 106.

The prediction decoder 106 performs a process corresponding to the process performed by the prediction coder 100 to restore frame images, and outputs the frame images to the reference image memory 107. The reference image memory 107 stores the restored images. The images stored in the reference image memory 107 as described above are referred when the prediction error signal and the like are generated by the prediction coder 100.

The switch 102 outputs the orthogonal transformation coefficient, the prediction mode information, and the like supplied from the orthogonal transformer/quantizer 101 to any one of the code amount measurer 103 and the entropy coder 108.

The code amount measurer 103 measures an amount of code obtained when an entropy coding process conforming to a first entropy coding scheme is performed to a signal representing the orthogonal transformation coefficient and the like input through the switch 102. The code amount measurer 103 according to the present embodiment measures an amount of code obtained when entropy coding based on Huffman coding is performed.

Figure 2:
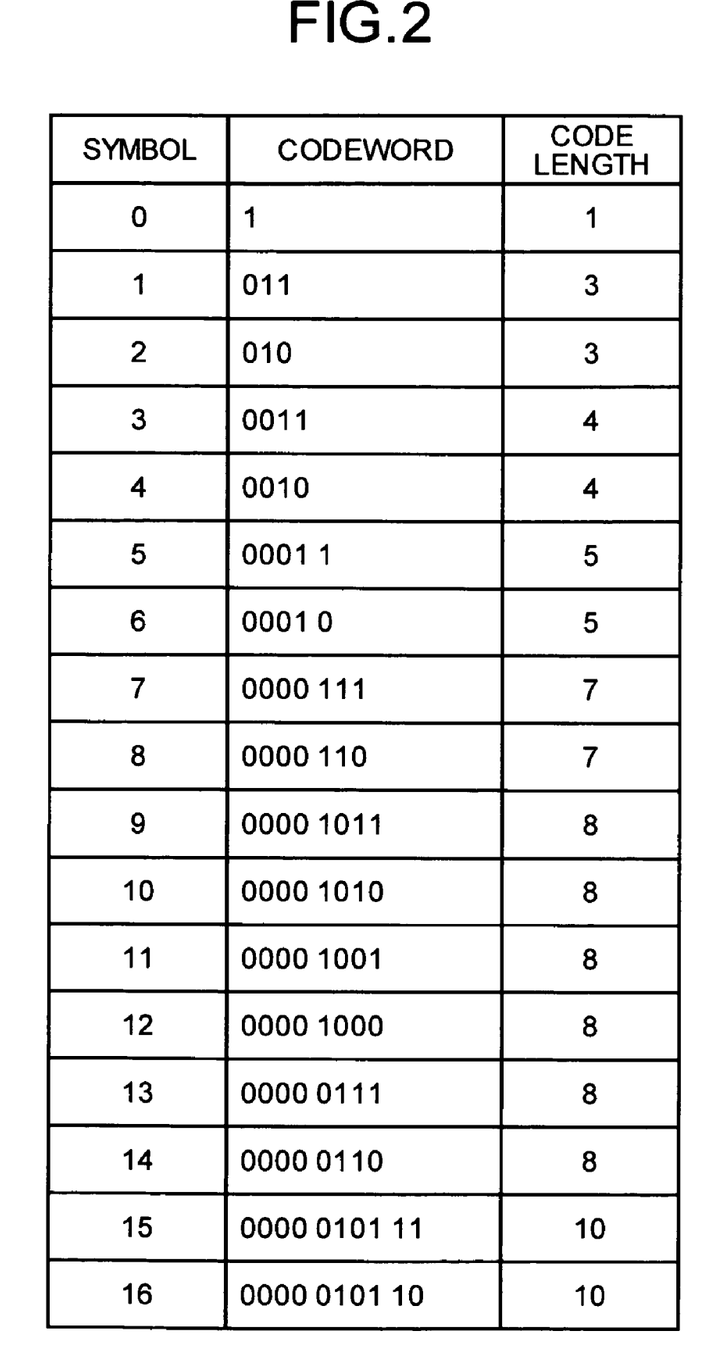
FIG. 2 depicts contents of a coding table used in a code amount measurer serving as a constituent element of the moving picture coding apparatus.

FIG. 2 is an example of a coding table used in Huffman coding. As shown in FIG. 2, in this table, an orthogonal transformation coefficient, prediction mode information, and the like are expressed by symbols. Codewords of variable length code are assigned to the symbols. The code amount measurer 103 refers to the Huffman coding table to cumulatively add the code lengths of the codewords used when the input orthogonal transformation coefficient, the prediction mode information, and the like are converted into variable length codes, thereby measuring an amount of code. The code amount measurer 103 performs only measurement of the amount of code without outputting entropy coded data.

The amount of code measured by the code amount measurer 103 is input to the coding mode controller 104. The coding mode controller 104 sets a prediction mode in the prediction coder 100. The prediction coder 100 performs a process conforming to the prediction mode set by the coding mode controller 104 to generate a prediction error signal and the like.

The coding mode controller 104 determines a prediction mode based on generated-code-amount information supplied from the code amount measurer 103. More specifically, the coding mode controller 104 sequentially sets a plurality of modes which can be executed in the moving picture coding apparatus 300 when an output terminal of the switch 102 is connected to the code amount measurer 103 in the prediction coder 100. When the processes are performed in the respective prediction modes, one mode is selected based on an amount of code of each mode supplied from the code amount measurer 103.

More specifically, for each pixel block to be coded, prediction coding and measurement of an amount of generated code (processes performed in an order of the prediction coder 100→the orthogonal transformer/quantizer 101→the switch 102→the code amount measurer 103→the coding mode controller 104 in FIG. 1) are performed in each of the modes. The amounts of code obtained in the respective modes are compared with each other to select any one mode from the modes. In the embodiment, the coding mode controller 104 selects a mode having the minimum amount of code.

When the coding mode controller 104 selects one mode as described above, signals and the like obtained by performing orthogonal transformation and quantization to the prediction error signals and the like generated by the processes conforming to the selected mode, i.e., signals generated by the prediction coder 100 and the orthogonal transformer/quantizer 101 in the selected mode, are output to the entropy coder 108 as data to be output through the switch 102.

The entropy coder 108 performs an entropy coding process conforming to a second coding scheme to the signals generated in the mode selected as described above. The second coding scheme has compression efficiency higher than that of the first coding scheme (coding performed by Huffman coding) performed by the code amount measurer 103. In the embodiment, the entropy coder 108 performs an entropy coding process performed by arithmetic coding. The data coded by the entropy coder 108 is output to the moving picture coding apparatus 300 as output data.

The configuration of the moving picture coding apparatus 300 has been explained. A moving picture coding method according to the present invention will be described below with reference to FIG. 3 on the assumption that the moving picture coding method is performed by the moving picture coding apparatus 300.

Figure 3:
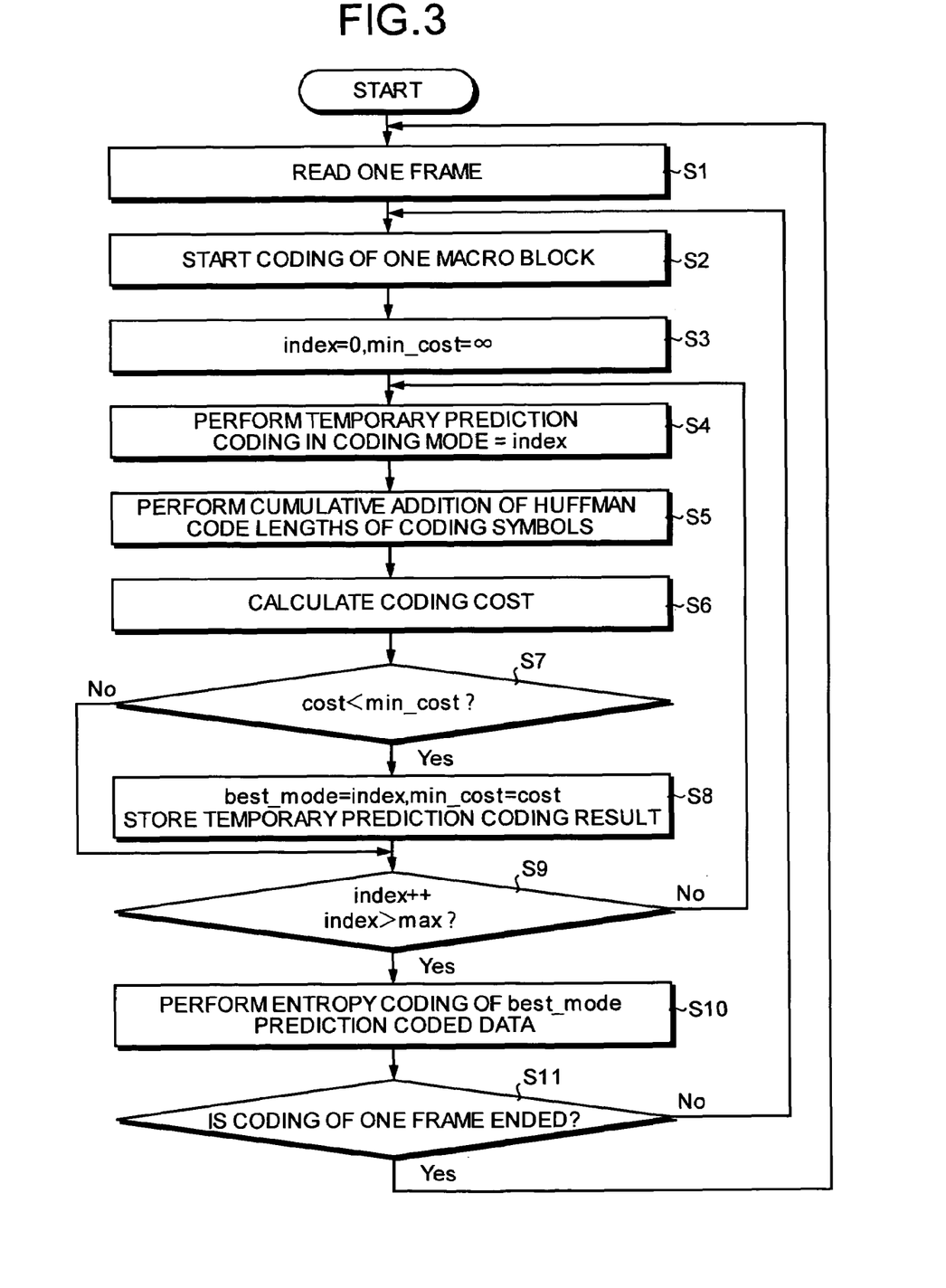
FIG. 3 is a flow chart of a procedure of a moving picture coding method performed by the moving picture coding apparatus.

When moving picture signals of each frame are input to the moving picture coding apparatus 300 (step S1), coding for the input image is started in units of pixel blocks (step S2). The coding mode controller 104 sets 0 at index representing a coding mode, and initializes a variable 'min_cost' representing the minimum cost with the maximum value (step S3).

The coding mode controller 104 sets a mode represented by the value of 'index' when the output terminal of the switch 102 is connected to the code amount measurer 103 in the prediction coder 100. In this manner, tentative prediction coding corresponding to a mode represented by the value of 'index' is performed by the prediction coder 100 and the orthogonal transformer/quantizer 101 (step S4), and an amount of code in the coding is measured by the code amount measurer 103 (step S5). The amount of code measured here has compression efficiency lower than that of an amount of code obtained by a coding process executed by the entropy coder 108 using Huffman coding or the like. In exchange for the low compression efficiency, a light arithmetic processing load can be achieved.

The coding mode controller 104 calculates a coding cost ('cost') based on the measured amount of generated code (step S6). The coding cost is, for example, the amount of generated code itself. The coding mode controller 104 decides whether the calculated coding cost ('cost') is smaller than the minimum cost 'min_cost' (step S7). When the coding cost is smaller than the minimum cost 'min_cost', the minimum cost 'min_cost' is updated with the coding cost, and the prediction mode 'index' of the tentative prediction coding performed at that time is held as 'best_mode' index. The tentative prediction coding result, that is, the coded data generated by the coding process corresponding to the mode represented by 'index' is held (step S8).

The coding mode controller 104 increments the coding mode 'index' to decide whether the incremented 'index' is larger than a predetermined value 'max' (step S9). In this case, the predetermined value 'max' is the number of modes which can be performed by the moving picture coding apparatus 300. When the determination result is "Yes", the processes at steps S4 to S8 are ended in all the modes.

When the incremented 'index' is smaller than the value 'max' ("No" in the determination at step S9), the processes at steps S4 to S9 are performed in the mode represented by the incremented 'index'.

When the 'index' is larger than the predetermined value 'max' ("Yes" in the determination at step S9), after the repeated processes from step S4 to step S8 in all the modes which can be performed by the moving picture coding apparatus 300, and the coding mode controller 104 selects an optimum coding mode ('best_mode'). More specifically, the mode represented by 'index' held in 'best_mode' index is selected as an optimum mode. More specifically, coding costs corresponding to the amounts of code in the respective modes are compared with each other, and a mode having the minimum coding cost is selected as an optimum coding mode.

When the optimum coding mode is selected, prediction coded data (coding symbol sequence) in the selected coding mode ('best_mode') is supplied to the entropy coder 108 through the switch 102. Entropy coding is performed by an entropy coding method such as an arithmetic coding having a higher compression rate and being different from the method used at step S5 (step S10). In this manner, coded data coded by the entropy coding process having a high compression rate is output. The processes are performed to all the pixel blocks in a frame. When coding for the pixel blocks in one frame ends ("Yes" in the determination at step S11), the next frame is input (step S1), and the same processes as described above are performed to the frame.

As described above, in the embodiment, a coding process is actually performed to each of a plurality of selectable coding modes, a mode having a minimum amount of code of coded data in the modes is selected, and data coded in the selected mode is output. Since a mode is selected based on results obtained by actually performing coding to all the modes, a mode that can perform coding at high coding efficiency can be selected. More specifically, a preferable mode selection can be performed depending on the contents of pixel blocks.

In the embodiment, in code amount measurement performed by the code amount measurer 103 to perform mode selection, code amount measurement is performed by a look-up table based on Huffman coding. More specifically, since code amount measurement having a relatively light processing load is performed, repeated code amount measurement can be executed at a high speed. On the other hand, final entropy coding in a selected mode is performed by the entropy coder 108. More specifically, since a coding process is performed by a coding scheme having a higher compression rate, coding efficiency of final coded data output from the moving picture coding apparatus 300 is high. However, an arithmetic coding load increases.

As the entropy coding, a variable length coding method in which codewords having variable lengths are assigned to symbols depending on the probabilities of generation of the symbols or an arithmetic coding method that sequentially generates codewords by an arithmetic operation depending on the probabilities of occurrence of symbol sequences are known. The variable length coding is employed in moving picture coding international standards such as MPEG-2 (ISO/IEC13818-2). In moving picture coding such as ITU-T Rec. H.264, two methods, that is, a variable length coding and an arithmetic coding, are provided as entropy coding methods. The arithmetic coding generally has a processing amount larger than that of a conventional variable length coding. When the arithmetic coding is repeated for the mode determination, the cost of encoder becomes larger than that of an encoder using the variable length coding. In particular, arithmetic coding employed in ITU-T Rec. H.264 or the like is called context base adaptive arithmetic coding, and employs a scheme that determines peripheral conditions in units of coding symbols, switches probability tables, and performs arithmetic coding. The arithmetic coding requires a very large amount of calculation in comparison with the conventional variable length coding.

Although an operation load becomes heavy to some extent, a coding process having a heavy load need not be performed in all the modes. Only coding in a selected mode may be performed. Therefore, increase in the operation load can be suppressed. More specifically, in the embodiment, high-speed and preferable mode selection and high-speed moving picture coding having high compression efficiency can be realized.

In the coding in the mode selected as described above, the orthogonal transformation coefficient obtained by quantizing the prediction error signal is also input to the inverse orthogonal transformer/inverse quantizer 105. The coefficient is subjected to inverse quantization and inverse orthogonal transformation to reproduce the prediction error signal. A local decode image is generated by the prediction decoder 106 and is temporarily stored as a reference image in the reference image memory 107. These local decode image generation processes may be performed in only the selected mode, and may not be performed in a loop for prediction mode determination.

Figure 4:
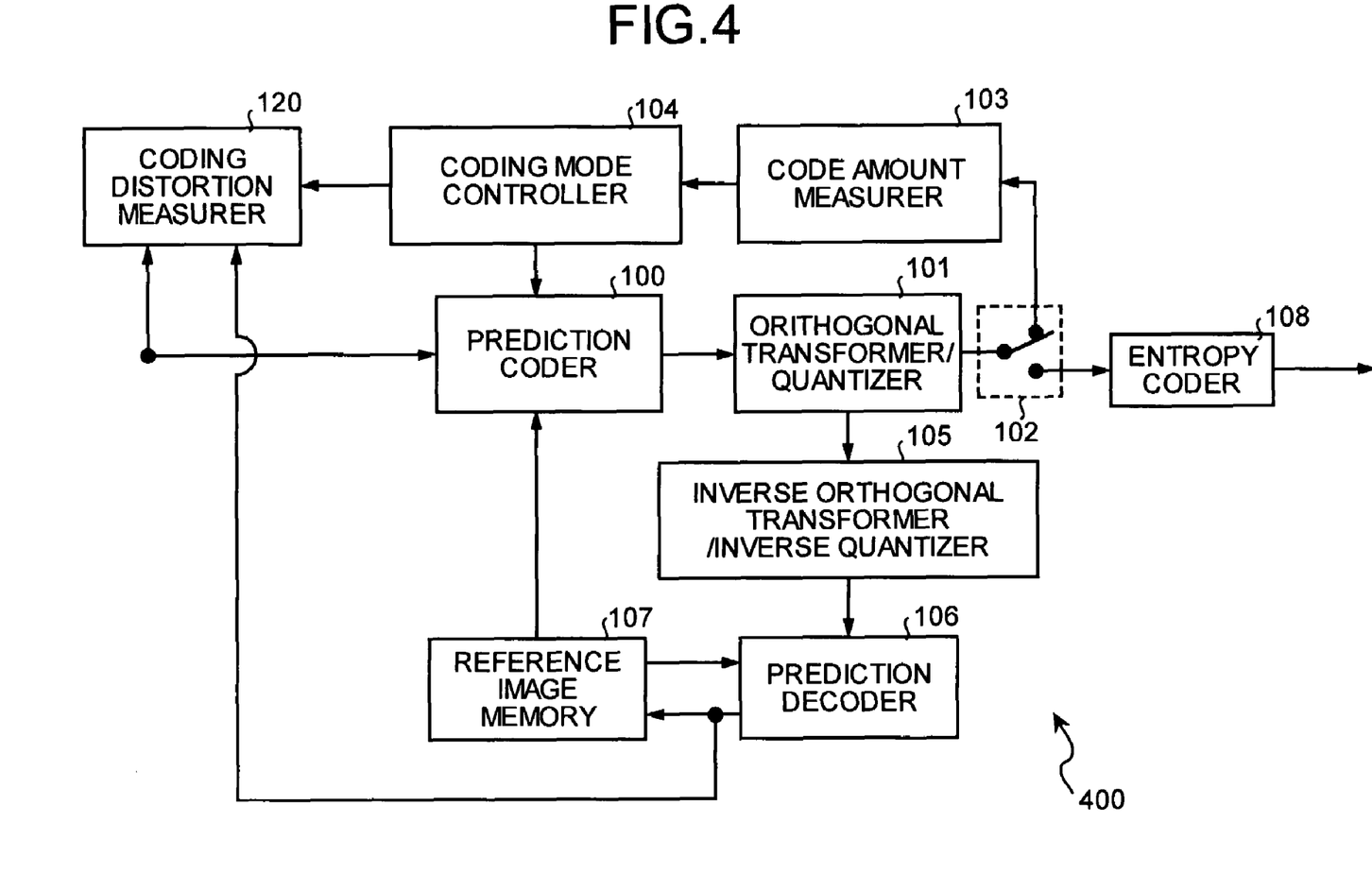
FIG. 4 is a block diagram of the configuration of a moving picture coding apparatus according to a second embodiment of the present invention.

FIG. 4 is a block diagram of the configuration of a moving picture coding apparatus 400 according to a second embodiment of the present invention. As shown in FIG. 4, the moving picture coding apparatus 400 according to the second embodiment is obtained by adding a coding distortion measurer 120 to the configuration of the moving picture coding apparatus 300 according to the first embodiment. Like reference numerals as in the first embodiment denote like parts in the second embodiment.

The coding distortion measurer 120 calculates a coding distortion (for example, a square error) which is an image difference between a local decode image generated by the inverse orthogonal transformer/inverse quantizer 105 and the prediction decoder 106, and an input image (original image before coding) to be coded. In this case, calculation of coding distortions performed by the coding distortion measurer 120 is performed in the modes set by the coding mode controller 104, that is, the modes which can be performed by the moving picture coding apparatus 400. More specifically, coding distortions representing differences between images obtained by restoring images processed in the modes and coded and the input image are measured.

In the moving picture coding apparatus 400 according to the second embodiment, a coding mode controller 104 selects one mode from the modes based on amounts of codes in the modes supplied from the code amount measurer 103 and the coding distortions in the modes supplied from the coding distortion measurer 120.

The coding mode controller 104 may select the best coding mode according to the following variable. That is, the amounts of code and the coding distortion costs are digitized in units of modes, and a mode in which a value obtained by linear combination of both the values is minimum is selected. A weighting factor used in the weighting addition can be determined by rate (amount of code)-distortion (coding distortion) optimization method (Rate-Distortion Optimization) or the like disclosed in Thomas Wiegand and Berand Girod, "Multi-frame motion-compensated prediction for video transmission", Kluwer Academic Publishers 2001 or the like. When a coding mode is determined by using the cost, a preferable prediction mode is selected in balance between an amount of code and a coding distortion to further improve coding efficiency.

When a mode is selected by the coding mode controller 104 as described above, as in the first embodiment, coding mode information, motion vector information, and a prediction error signal in the selected mode are supplied to the entropy coder 108 through the switch 102. The entropy coder 108 performs entropy coding at efficiency higher than that of the code amount measurer 103 to output coded data.

The configuration of the moving picture coding apparatus 400 according to the second embodiment has been explained. The moving picture coding method according to the present invention will be described below with reference to FIG. 5 on the assumption that the moving picture coding method is performed by the moving picture coding apparatus 400.

Figure 5:
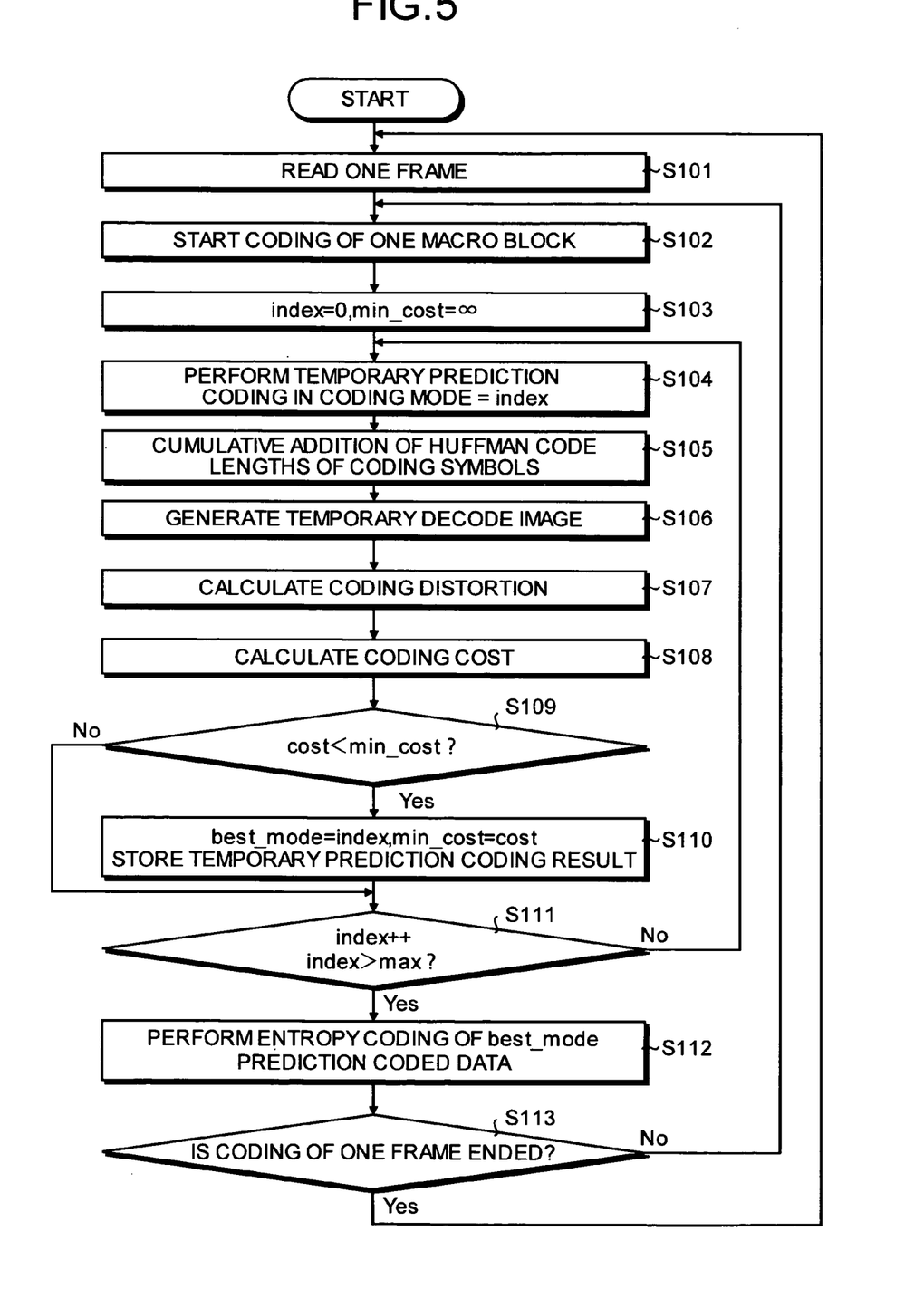
FIG. 5 is a flow chart of a procedure of a moving picture coding method performed in the moving picture coding apparatus according to the second embodiment.

When moving picture signals of each frame are input to the moving picture coding apparatus 400 (step S101), coding for the input image is started in units of pixel blocks (step S102). The coding mode controller 104 sets 0 at index representing a coding mode, and initializes a variable 'min_cost' representing the minimum cost with the maximum value (step S103).

The coding mode controller 104 sets a mode represented by the value of 'index' in the prediction coder 100. Tentative prediction coding corresponding to the mode represented by the value of 'index' is performed by the prediction coder 100 and the orthogonal transformer/quantizer 101 (step S104), and the amount of code used in the coding is measured by the code amount measurer 103 (step S105).

On the other hand, the image coded by the prediction coder 100 and the orthogonal transformer/quantizer 101 is restored into a temporary decode image by the inverse orthogonal transformer/inverse quantizer 105 and the prediction decoder 106. Based on the temporary decode image and an input image (original image before coding) to be coded, a coding distortion which is the difference between these images is calculated (S107).

The coding mode controller 104 calculates a coding cost based on the linear combination of the measured amount of generated code and the coding distortions (step S108). The coding mode controller 104 decides whether the calculated value ('cost') is smaller than the minimum cost 'min_cost' (step S109). When 'cost' is smaller than the minimum cost, the minimum cost 'min_cost' is updated with 'cost'. A prediction mode index of the tentative prediction coding performed at this time is held as 'best_mode' index. The tentative prediction coding result, that is, coded data generated by the coding process corresponding to the mode represented by 'index' is held (step S110).

The coding mode controller 104 increments the coding mode 'index' and decides whether the incremented 'index' is larger than a predetermined value 'max' (step S111). When the incremented 'index' is smaller than the value 'max' ("No" in the determination at step S111), the processes at steps S104 to S111 are performed in the mode represented by the incremented 'index'.

When the 'index' is larger than the predetermined value 'max' ("Yes" in the determination at step S111), after the repeated processes from step S104 to step S111 in all the modes, and the coding mode controller 104 selects an optimum coding mode ('best_mode'). More specifically, the mode represented by 'index' held in 'best_mode' index is selected as an optimum mode.

When the optimum coding mode is selected, prediction coded data (coding symbol sequence) in the selected coding mode ('best_mode') is supplied to the entropy coder 108 through the switch 102. Entropy coding is performed by an entropy coding method such as an arithmetic coding method having a higher compression rate (step S112). The processes are performed to all the pixel blocks in a frame. When coding for the pixel blocks in one frame end ("Yes" in the determination at step S113), the next frame is input (step S1), and the same processes as described above are performed to the frame.

As described above, in the second embodiment, a coding process is actually performed to each of a plurality of selectable coding modes, amounts of codes of coded data in the modes are measured, and coding distortions are measured in the modes. A mode is selected based on the amounts of code and the coding distortions in the modes obtained by actually performing coding in the modes. Therefore, a mode can be appropriately selected. More specifically, a mode which can achieve less image deterioration and having a small amount of code can be selected.

In the second embodiment, as in the first embodiment, in measurement of amounts of code performed by the code amount measurer 103 to select a mode, coding having a light processing load is used. On the other hand, as entropy coding for data to be finally output, a coding process using a coding scheme having a higher compression rate is performed. Therefore, as in the first embodiment, high-speed and preferable mode selection and high-speed moving picture coding having high compression efficiency can be realized.

The moving picture coding processes performed in the above embodiments may be designed to be performed by a dedicated hardware circuit, or may be designed such that a central processing unit (CPU) is operated according to a program to perform a moving picture coding process including mode selection (see FIGS. 3 and 5). A program that causes a computer to execute the process may be provided to a user through a communication line such as the Internet, or a computer readable recording medium such as a CD-ROM (Compact Disc-Read Only Memory) on which the program is recorded may be provided to a user.

As described above, the moving picture coding apparatus and the moving picture coding method according to the present invention are useful for a technique of performing compression, transmission, recording, and the like of a moving picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for coding a moving picture, comprising:
a prediction coder generating signals to be entropy coded, each signal to be entropy coded being generated based on a different prediction mode;
a code amount measurer measuring amounts of code of the signals to be entropy coded when the signals each are coded by a first entropy coding method;
a mode controller selecting one of the prediction modes based on a comparison of the amounts of code; and
an entropy coder coding the signal generated based on the selected prediction mode by a second entropy coding method having efficiency higher than that of the first entropy coding method.

2. The apparatus according to claim 1, wherein the prediction coder generates a prediction signal and the prediction error signal for each prediction mode by subtracting the prediction signal from an image of the moving picture.

3. The apparatus according to claim 2, further comprising a local decoder reconstructing the image of the moving picture from the predication error signals to be coded as a reference image for the following image of the moving picture,
wherein the first coder generates the prediction error signals by using the reference image.

4. The apparatus according to claim 3, further comprising coding distortion measurer calculating a coding distortion between the image of the moving picture to be coded and an image obtained by locally decoding the image of the moving picture,
wherein the mode controller selects one of the prediction modes based on the amounts of code and the coding distortion.

5. The apparatus according to claim 1, wherein
the first entropy coding method is based on variable length coding, and
the second entropy coding method is based on arithmetic coding.

6. A method of coding a moving picture, comprising:
generating signals to be entropy coded, each signal to be entropy coded being generated based on a different prediction mode;
measuring amounts of code of the signals to be entropy coded when the signals each are coded by a first entropy coding method;
selecting one of the prediction modes based on a comparison of the amounts of code; and
entropy coding the signal generated based on the selected prediction mode by a second entropy coding method having efficiency higher than that of the first entropy coding method.

7. The method according to claim 6, wherein the coding of the moving picture includes generating a prediction signal and the prediction error signal for each prediction mode by subtracting the prediction signal from an image of the moving picture.

8. The method according to claim 7, further comprising reconstructing the image of the moving picture from the predication error signals to be coded as a reference image for the following image of the moving picture,
wherein the coding of the moving picture includes generating the prediction error signals by using the reference image.

9. The method according to claim 8, further comprising calculating a coding distortion between the image of the moving picture to be coded and an image obtained by locally decoding the image of the moving picture,
wherein the selecting includes selecting one of the prediction modes based on the amounts of code and the coding distortion.

10. The method according to claim 6, wherein
the first entropy coding method is based on variable length coding, and
the second entropy coding method is based on arithmetic coding.

11. A computer-readable medium storing a computer program product including programmed instructions, wherein the instructions, when executed by a computer, cause the computer to perform:
generating signals to be entropy coded, each signal to be entropy coded being generated based on a different prediction mode;
measuring amounts of code of the signals to be entropy coded when the signals each are coded by a first entropy coding method;
selecting one of the prediction modes based on a comparison of the amounts of code; and entropy coding the signal generated based on the selected prediction mode by a second entropy coding method having efficiency higher than that of the first entropy coding method.

12. The computer program product according to claim 11, wherein the coding of the moving picture includes generating a prediction signal and the prediction error signal for each prediction mode by subtracting the prediction signal from an image of the moving picture.

13. The computer program product according to claim 12, wherein the instructions further cause the computer to perform reconstructing a the image of the moving picture from the predication error signals to be coded as a reference image for the following image of the moving picture, wherein the coding of the moving picture includes generating the prediction error signals by using the reference image.

14. The computer program product according to claim 13, wherein the instructions further cause the computer to perform calculating a coding distortion between the image of the moving picture to be coded and an image obtained by locally decoding the image of the moving picture, wherein the selecting includes selecting one of the prediction modes based on the amounts of code and the coding distortion.

15. The computer program product according to claim 11, wherein the first entropy coding method is based on variable length coding, and the second entropy coding method is based on arithmetic coding.

* * * * *